May 21, 1968  C. M. STEVENS  3,384,702
ELECTRIC POWER BUSWAY WITH NOVEL HOUSING CONSTRUCTION
Filed Aug. 5, 1966

INVENTOR.
CLARENCE M. STEVENS
BY Robert N. Casey
ATTORNEY

United States Patent Office 3,384,702
Patented May 21, 1968

3,384,702
ELECTRIC POWER BUSWAY WITH NOVEL HOUSING CONSTRUCTION
Clarence M. Stevens, West Hartford, Conn., assignor to General Electric Company, a corporation of New York
Filed Aug. 5, 1966, Ser. No. 570,504
11 Claims. (Cl. 174—68)

ABSTRACT OF THE DISCLOSURE

An electric power busway including a number of wide flat insulated bus bars compressed between a pair of sheet metal housing side members; the housing side members extend substantially above and below the bus bar assembly and are joined together by top and bottom housing cover members at their outer edges and by a pair of sheet metal tie plates closely adjacent the bus bar edges; each housing side member in its free form is curved about its longitudinal central axis and so has an inherent bias pressing the bus bars together when in the completed assembly.

BACKGROUND OF THE INVENTION (1) *Field of the invention.*—My invention relates to electric power busways and particularly to such busways capable of carrying high values of current at substantial voltages, such, for example, as 100 to 2000 amperes at 600 volts.

(2) *Description of the prior art.*—Such busways in general comprise prefabricated sections of metallic housing or duct having a plurality of electrical busbars supported in insulated relation therein. The system includes fittings and power take-off devices, whereby the system is usable for transporting electric power from one point, usually the power incoming point in a building, to other locations in the building where the power is to be utilized. Design objectives for such power busways include the following: (a) high current carrying capacity for a given amount of copper conductor cross-section, (b) size and weight as low as possible, (c) ease of handling and assembling of the prefabricated sections by the original manufacturer and also ease of handling and assembly of sections during installation and connection by the user or contractor, and (d) ability to withstand relatively high short circuit currents and forces generated thereby. It will, of couse, be appeciated that low cost and design simplicity in general are also basic design objectives.

It is well known that high short circuit currents generate high magnetic forces acting to drive adjacent conductors of a power busway apart. In accordance with the prior art, means has ordinarily been provided retaining the busbars together as a group. Such retaining means has ordinarily been provided separate from the housing, and the housing therefore only secondarily adds some strength resisting separation of the conductors. The necessity for tying, banding, bonding, bolting, gluing, or otherwise pre-assembling the busbar conductors together before placing them in the housing has added to the time and expense of assembly of prior art busways. In addition, such "internal" bar retaining means do not have as great a force-resisting ability as desirable under some circumstances.

OBJECTS OF THE INVENTION

It is an object of the pesent invention to provide a busway construction in which the outer housing not only serves as a means for dissipating heat generated in the conductors, but also provides the primary support retaining the conductors together against short-circuit forces.

It is a further object of the invention to provide an electric power busway capable of carrying a greater amount of current for a given amount of conductor cross-section without exceeding pre-set temperature-rise limits.

It is another object of the invention to provide an electric power busway design which is easier for the manufacturer to assemble than comparable prior art designs.

SUMMARY OF THE INVENTION

In accordance with the invention in one form, an electric power busway system is provided comprising a generally rectangular metallic duct including a pair of opposed side walls of sheet metallic material. The side walls of the busway housing are initially curved so that as assembly is commenced, the center portions thereof are closer together than the outer edge portions. In assembly, these outwardly diverging side portions are brought into engagement with opposite side portions of an assembly of insulated electric busbars. A pair of "tie plates" is provided, extending between the side plates immediately above and below the assembly of busbar conductors. The side wall portions and the tie plates are then connected together by suitable means, such as by welding, whereby the tie plates work in tension to hold the side plates together and in intimate thermal contact with opposite side walls of the busbar conductor assembly. The inwardly directed force exerted by the opposite side wall members which are trying to return to their bowed condition thus presses these side wall portions into intimate thermal contact with the side walls of the busbar conductors. An additional benefit of this normal inwardly-directed force exerted by the side walls is that it creates a normally existing force compressing the bars together. On the occurrence of short circuit conditions, this force must be overcome by any magnetic forces associated with short circuit currents before these forces can tend to move the side walls apart. Thus a "pre-stressed" type of assembly is provided, greatly increasing the ability of the housing to resist short circuit current forces.

In accordance with another aspect of the invention, the means tying the opposed side walls together comprises a pair of sheet metal "tie plates" substantially coextensive in length with the busbar section and substantially in contact, when assembled, with the upper and lower edges respectively of the assembly of busbars. Thus these tie plates also serve as means for conducting heat generated in the busbar conductors away therefrom and for radiating it to the ambient atmosphere.

The force exerted by the side walls in tending to bow inwardly toward each other is in a direction normal to the planes of separation of the busbar conductors positioned therebetween. In other words, the planes of the major wide flat surfaces of the busbars extend substantially parallel to the planes of the side walls. In accordance with another aspect of the invention, each of the side walls is provided with an intermediate return-bent or U-shaped portion which receives an edge portion of one of the aforesaid tie plates, whereby these members may be more readily fastened together by suitable means.

If desired, these members may be fastened together by welding all along their length so that the insulated busbar conductors are contained within a completely sealed chamber into which no moisture can readily enter.

In accordance with an aspect of the invention, the side walls of the housing are extended beyond the point where they join with the aforesaid tie plates, and a pair of top and bottom plates are attached to the side walls at this point, forming a pair of elongated chambers above and below the busbar assembly and, in effect, providing a housing having three cells or chambers therein, separated from each other by metallic walls, the center of which contains the insulated electrical busbar conductors. The chambers above and below the busbar chamber provide additional heat radiation surfaces and in effect comprise hollow strength-beam members, providing an extremely high degree of rigidity to the overall assembly.

The invention will be more fully understood from the following detailed description, and its scope will be pointed out in the appended claims.

BRIEF DESCRIPTION OF A PREFERRED EMBODIMENT

Figure 1:
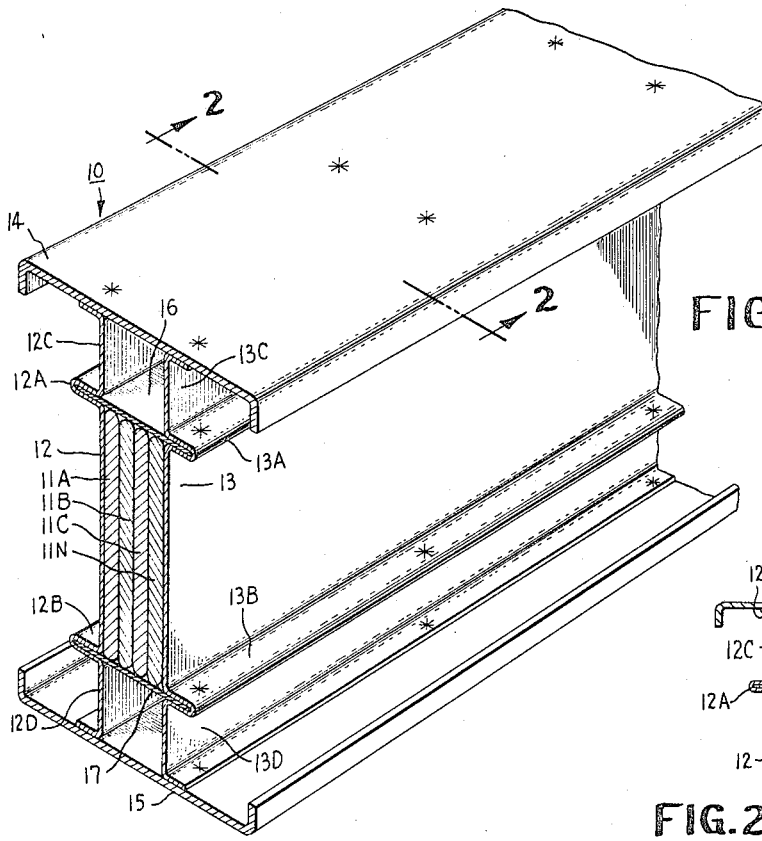
FIGURE 1 is a perspective view of a portion of an electric power busway apparatus constructed in accordance with the invention.

In the drawing, the invention is shown as incorporated in an electric power busway comprising a multi-chamber metallic housing 10 having four insulated electric busbars 11A, 11B, 11C, and 11N supported therein.

Figure 2:
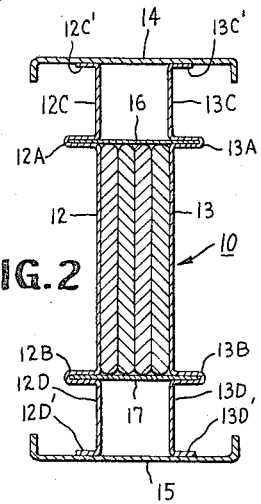
FIGURE 2 is a sectional view of the busway shown in FIGURE 1 taken along the line 2—2 of FIGURE 1.

Referring particularly to FIGURE 2, the metallic housing 10 comprises a pair of formed sheet metallic side members 12 and 13 of suitable metal such as steel or aluminum. The side members 12 and 13 each have intermediate portions offset and return-bent to provide U-shaped intermediate portions 12A and 12B and 13A, 13B respectively. The side plates 12 and 13 are also provided with upper and lower extensions 12C, 12D, 13C, 13D, terminating in outwardly directed flanges 12C′, 12D′, 13C′, 13D′, respectively. Generally channel-shaped top and bottom members 14 and 15 are also provided, which are attached to the flange portions 12C′, 13C′, 12D′, 13D′ of the side members 12 and 13 respectively by suitable means, such as by welding.

The side members 12 and 13 are furthermore interconnected at their intermediate portions 12A, 12B, and 13A, 13B by means of elongated sheet metal tie plates 16 and 17, in a manner to be described.

It will be understood that the busbars 11A, 11B, 11C, and 11N are each provided with a coating of insulating material which insulates it from the other bars and from the housing. The insulating coating on each of the bars is not separately shown or numbered in the drawings, however, because on the scale of this drawing, it is not practical to do so.

The tie plates 16 and 17 may be attached to the intermediate offset portions 12A, 13A, and 12B, 13B of the side members 12 and 13 by any desirable means such as by bolting, riveting, welding, etc. In a preferred form of the invention, however, the tie plates 16 and 17 are welded to the intermediate offset portions 12A, 12B and 13A, 13B, since this method of attachment does not perforate the side wall members 12 and 13 at the points of attachment, and therefore the busbar assembly which is contained within the rectangular chamber formed by the side walls 12, 13 and the tie plates 16 and 17 is much more effectively isolated from the entrance of foreign materials, such, for example, as water, acids, etc.

The busway construction as described above and illustrated in FIGURES 1 and 2 provides an extremely strong, relatively light weight, highly water-tight busway construction. Since the tie plates 16 and 17 interconnect the side members 12 and 13 all along the length of the busbars, and since they do so at points closely adjacent to the busbars themselves, a housing is provided which has the ability to withstand the magnetic forces associated with relatively high short circuit currents which tend to drive the busbar conductors 11A, 11B, 11C and 11N apart. For example, such forces are, as is well known, equally distributed along the length of the parallel conductors. The housing provided is particularly effective for resisting such forces since the connecting means tying the opposite side walls together is similarly distributed equally along the length of the busbar conductors.

In accordance with another form of the invention, not separately illustrated, I may join the tie plates 16 and 17 to the corresponding offset portions 12A, 13A, and 12B, 13B by a continuous running welded seam. Such construction has the advantage that the means connecting the opposite side walls 12 and 13 together is equally distributed along the length of the conductors in the same manner that the force tending to drive these conductors apart is also distributed.

The busway construction provided in accordance with the invention also has a very high ability to conduct and dissipate heat generated in the busbar conductors by the passage of current therethrough. Thus it will be observed that the members comprising the housing include large portions of the side members 12 and 13 and also of the tie plates 16 and 17 which are in close intimate thermal contact with the busbars, there being only a thin layer of insulation therebetween. The tie plates 16 and 17 are also in thermal contact with the insulated edges of the busbar conductors. Each of these members also has substantial areas thereof exposed to the air whereby heat conducted from the busbar conductors to the metallic housing members may be radiated and removed by conduction by the adjacent air, to thereby dissipate such heat. In addition, the top and bottom plate members 14 and 15 not only provide additional heat radiating and conducting surfaces, but also provide convenient means for handling and installing the busway sections.

Figure 3:
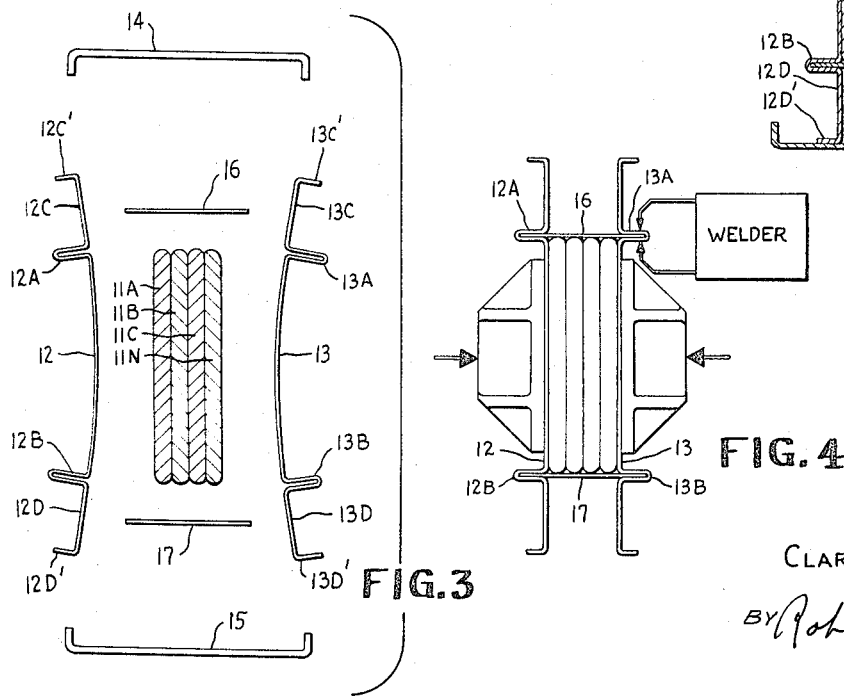
FIGURE 3 is a sectional view similar to FIGURE 2 showing the parts of the busway of FIGURE 1 in the general position that they occupy just prior to assembly, the top and bottom plates being shown in exploded relation.
Figure 4:
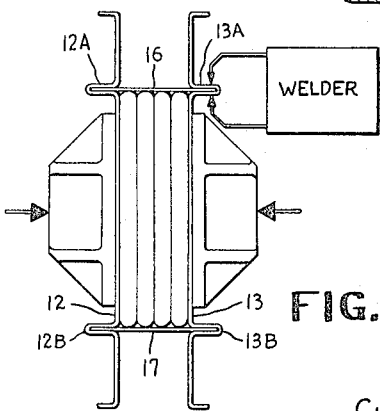
FIGURE 4 is a view generally similar to FIGURE 3 showing the next stage of assembly of the busway of FIGURE 1, the top and bottom plates being omitted.

In accordance with the invention in its preferred form, a further feature is included, as illustrated particularly in FIGURES 3 and 4.

In accordance with this aspect of the invention, the opposite side plate members 12 and 13 are intially provided with an outwardly bowed configuration so that when in position ready for assembly, the mid points of the opposite sides are closer to each other than their other edges.

As illustrated in FIGURE 4, the busbar conductors 11A, 11B, 11C, and 11N are placed in side-by-side contact, and the tie plates 16 and 17 are placed in position adjacent the opposite edges of the busbars. The side plates 12 and 13 are brought into the position shown in FIGURE 4 with the central portions thereof substantially contacting the central portions of the outer busbars of the group. As illustrated in FIGURE 4, force is then applied to the side members 12 and 13, moving them to a flattened condition against their inherent bias and compressing them and the busbar conductor assembly tightly together. With the assembly held in this condition, the tie plates 16 and 17 are then joined to the intermediate portions 12A, 13A and 12B, 13B by suitable means, such as by welding. The top and bottom plates 14 and 15 may then be attached to the flanges 12C′, 13C′, and 12D′, 13D′. Preferably, this is done while the force is maintained on the side walls as indicated in FIGURE 4.

With the parts assembled in the manner described, the side members 12 and 13 have an inherent bias after the parts are assembled, even though they present the appearance of being straight, as indicated in FIGURE 2. Such inherent bias forces the central portions of the side members 12 and 13 toward each other and against the busbar assembly, compressing into intimate thermal contact with the outer insulated bars as well as pressing the bar assembly itself together. As previously mentioned, this not only improves the thermal transfer from the busbars to the housing, but also creates a "pre-stressed" assembly, such that the inherent force tending to move the side walls together must first be overcome by any short circuit magnetic forces tending to move the conductors apart before outward bowing of the side member can occur.

It will be understood that I have shown and described only an intermediate section of a busway system construction in accordance with the invention and that such system preferably would be constructed in predetermined preassembled lengths, such as ten-foot lengths, and that at each end of such lengths the conductors would be modified so as to permit ready connection to other similar lengths, such, for example, as extending the conductors beyond the housing portion and separating or "fanning" the end portions thereof and removing the insulation from such end portions so that they may be overlapped with corresponding end portions of adjacent section, and subjected to connecting in any suitable manner such, for example, as by clamping.

It will also be understood that while I have shown only continuous, closed housing section, such housing may be modified such as by widening and separating the busbar conductors to permit the insertion of power take-off device contacts of the plug-in type if desired.

Accordingly, it will be readily appreciated that many modifications may readily be made by those skilled in the art, and I therefore intend by the appended claims to cover all such modifications as fall within the true spirit and scope of the invention.

What I claim as new and desire to secure by Letters Patent of the United States is:

1. Electric power busway apparatus comprising:
    (a) a busbar assembly including at least three relatively wide thin flat elongated busbar conductors supported in side-by-side relation;
    (b) insulating means insulating said busbar conductors from each other;
    (c) metallic housing means comprising a pair of opposed elongated sheet metallic side members each having a width substantially greater than the largest transverse dimension of said busbar assembly, said side members each having a longitudinal intermediate portion in electrically insulated close thermal contact with said busbar assembly and outer longitudinal portions extending a substantial distance at opposite sides of said busbar assembly;
    (d) first connecting means interconnecting said pair of side members at opposite sides of said busbar assembly at a plurality of longitudinally disposed points spaced a substantial distance from said busbar assembly;
    (e) second connecting means interconnecting said pair of side members at opposite sides of said busbar assembly at a plurality of longitudinally disposed points closely adjacent said busbar assembly, said second connecting means being positively fastened to said side members and being independent of said busbar assembly.

2. Electric power busway apparatus as set forth in claim 1 wherein said first and second connecting means each comprises a pair of elongated sheet metallic members each substantially co-extensive lengthwise with said busbar conductors.

3. Electric power busway apparatus comprising:
    (a) a busbar assembly including at least three relatively wide thin flat elongated busbar conductors supported in side-by-side juxtaposed relation;
    (b) insulating means insulating said busbar conductors from each other;
    (c) metallic housing means comprising a pair of opposed elongated sheet metallic side members each having a width substantially greater than the width of said busbar conductors, said side members each having a longitudinal intermediate portion in electrically insulated close thermal contact with the side portion of one of said busbar conductors and outer longitudinal portions extending a substantial distance at opposite sides of said busbar conductors;
    (d) a first pair of elongated sheet metallic members interconnecting said side members at opposite sides of said busbar assembly at points spaced a substantial distance from said busbar assembly;
    (e) a second pair of elongated sheet metallic members each substantially co-extensive lengthwise with said busbar conductors interconnecting said pair of side members at opposite sides of said busbar assembly at points closely adjacent said busbar assembly.

4. Electric power busway apparatus as set forth in claim 3, wherein said sheet metallic members of said second connecting means each include an intermediate longitudinal portion in electrically insulating close thermal contact with edge portions of said busbar conductors.

5. Electric power busway apparatus comprising:
    (a) a busbar assembly including at least three relatively wide thin flat elongated busbar conductors supported in side-by-side juxtaposed relation;
    (b) insulating means insulating said busbar conductors from each other;
    (c) metallic housing means comprising a pair of opposed elongated sheet metallic side members each having a width substantially larger than the width of said bus bar conductors, said side members each having a longitudinal intermediate portion in electrically insulated close thermal contact with said busbar assembly and outer longitudinal portions extending a substantial distance at opposite sides of said busbar assembly;
    (d) said intermediate portion and said outer portions comprising integral portions of a single sheet metallic member;
    (e) first connecting means interconnecting said pair of side members at their outer edge portions thereof at opposite sides of said busbar assembly and spaced a substantial distance from said busbar assembly;
    (f) second connecting means comprising a pair of elongated sheet metallic members each having a longitudinal intermediate portion thereof in intimate thermal contact with edge portions of said busbar conductors, said elongated sheet members being connected to said side members at intermediate portions thereof.

6. Electric power busway apparatus as set forth in claim 5 wherein said side members each include a pair of generally U-shaped cross-section ribs extending outwardly therefrom longitudinally thereof and said second connecting sheet metallic members include edge portions each received within one of said ribs of said side members, and means rigidly connecting said edge portions of said second connecting members to said ribs respectively.

7. Electric power busway apparatus as set forth in claim 6, said second connecting sheet members being connected to said ribs by non-perforating connecting means.

8. Electric power busway apparatus as set forth in claim 6, wherein said connecting means which connects said second connecting plates to said ribs of said side members comprises non-perforating connecting means extending substantially continuously throughout the major portion of the length of said apparatus.

9. Electric power busway apparatus comprising:
    (a) a busbar assembly including at least three relatively wide thin flat elongated busbar conductors supported in side-by-side juxtaposed relation;
    (b) insulating means insulating said busbar conductors from each other;
    (c) metallic housing means comprising a pair of opposed elongated sheet metallic side members each having a width substantially greater than the largest transverse dimension of said busbar assembly, said side members each having a longitudinal intermediate portion in electrically insulated close thermal contact with said busbar assembly and outer longitudinal portions extending a substantial distance at opposite sides of said busbar assembly;

(d) said side members each having an inherent bias pressing said longitudinal intermediate portion against said busbar assembly and tending to move corresponding outer portions of said pair of side members away from each other;

(e) first connecting means interconnecting said pair of side members at opposite sides of said busbar assembly at points spaced a substantial distance from said busbar assembly;

(f) second connecting means interconnecting said pair of side members at opposite sides of said busbar assembly at points closely adjacent said busbar assembly;

(g) said first and second connecting means restraining said side members in substantially flattened condition in close thermal contact with said busbar assembly.

10. Electric power busway apparatus comprising:
(a) a busbar assembly including at least three relatively wide thin flat elongated busbar conductors supported in side-by-side juxtaposed relation with opposite edge portions in substantially common planes;

(b) insulating means insulating said busbar conductors from each other;

(c) metallic housing means comprising a pair of opposed elongated sheet metallic side members each having a width substantially larger than the width of said busbar conductors;

(d) first connecting means interconnecting said pair of side members at outer edge portions thereof at opposite sides of said busbar assembly;

(e) second connecting means comprising an elongated sheet metallic member having a longitudinal intermediate portion thereof in intimate thermal contact with said edge portions of said busbar conductors, said elongated sheet member being connected to said side members at intermediate portions thereof;

(f) said side members each including a generally U-shaped cross-section rib extending outwardly therefrom longitudinally thereof and said second connecting sheet metallic member having its opposite edge portions each received within one of said ribs of said side members, and means rigidly connecting said edge portions of said second connecting member to said ribs respectively.

11. Electric power busway apparatus comprising:
(a) a busbar assembly including at least three relatively wide thin flat elongated busbar conductors supported in side-by-side relation;

(b) insulating means insulating said busbar conductors from each other;

(c) metallic housing means comprising a pair of opposed elongated sheet metallic side members each having a width substantially greater than the largest transverse dimension of said busbar assembly, said side members each having a longitudinal intermediate portion in electrically insulated close thermal contact with said busbar assembly and outer longitudinal portions extending a substantial distance at opposite sides of said busbar assembly;

(d) first connecting means interconnecting said pair of side members at opposite sides of said busbar assembly at a plurality of longitudinally disposed points spaced a substantial distance from said busbar assembly;

(e) second connecting means interconnecting said pair of side members at opposite sides of said busbar assembly closely adjacent said busbar assembly;

(f) said first and second connecting means each comprising a pair of elongated sheet metallic members each substantially co-extensive lengthwise with said busbar conductors; and (g) said elongated sheet metallic members of said first and second connecting means being connected to said side members substantially continuously throughout the major portion of the length of said busway apparatus.

References Cited
UNITED STATES PATENTS 3,183,299  5/1965  Johnston et al. _____ 174—99
3,187,086  6/1965  Moodie et al. _____ 174—68

LARAMIE E. ASKIN, *Primary Examiner.*